US011442570B2

(12) United States Patent
Li et al.

(10) Patent No.: US 11,442,570 B2
(45) Date of Patent: Sep. 13, 2022

(54) TOUCH DISPLAY DEVICE (71) Applicants: BOE TECHNOLOGY GROUP CO., LTD., Beijing (CN); HEFEI BOE OPTOELECTRONICS TECHNOLOGY CO., LTD., Anhui (CN)

(72) Inventors: Hu Li, Beijing (CN); Jian He, Beijing (CN)

(73) Assignees: Beijing BOE Technology Development Co., Ltd., Beijing (CN); Hefei BOE Optoelectronics Technology Co., Ltd., Anhui (CN)

(*) Notice: Subject to any disclaimer, the term of this patent is extended or adjusted under 35 U.S.C. 154(b) by 817 days.

(21) Appl. No.: 16/077,061

(22) PCT Filed: Feb. 7, 2018

(86) PCT No.: PCT/CN2018/075582
§ 371 (c)(1),
(2) Date: Aug. 10, 2018

(87) PCT Pub. No.: WO2018/205701
PCT Pub. Date: Nov. 15, 2018

(65) Prior Publication Data
US 2021/0208716 A1 Jul. 8, 2021

(30) Foreign Application Priority Data

May 11, 2017 (CN) .......................... 201710329945.1

(51) Int. Cl.
*G06F 3/041* (2006.01)
*G06F 3/044* (2006.01)
(52) U.S. Cl.
CPC ............ *G06F 3/0416* (2013.01); *G06F 3/044* (2013.01); *G06F 3/0412* (2013.01);
(Continued)

(58) Field of Classification Search
None
See application file for complete search history.

(56) References Cited

U.S. PATENT DOCUMENTS

2017/0090674 A1* 3/2017 Meng ..................... G06F 3/0447
2017/0315669 A1* 11/2017 Oh ......................... G06F 3/0412
2018/0260051 A1* 9/2018 Kim ....................... G06F 3/0445

FOREIGN PATENT DOCUMENTS

CN        205015863 U    2/2016
CN        205230006 U    5/2016
(Continued)

OTHER PUBLICATIONS

Second Office Action for Chinese Patent Application No. 201710329945.1 dated Aug. 29, 2019.
(Continued)

*Primary Examiner* — Stephen T. Reed
(74) *Attorney, Agent, or Firm* — Calfee, Halter & Griswold LLP (57) ABSTRACT A touch display device includes a display panel; a backlight that includes a back plate; a pressure touch detection chip; a pressure sensing layer and a voltage reference layer arranged between the display panel and the back plate, the pressure sensing layer and the voltage reference layer are opposite to each other and arranged in different layers. The pressure sensing layer includes a plurality of sensing electrodes arranged as an array, where each sensing electrode is electrically connected to the pressure touch detection chip through a lead wire. The voltage reference layer is configured to receive a stable reference voltage signal; and the pressure touch detection chip is configured to determine a value of a pressure on the display panel according to a detected change of capacitance between the pressure sensing layer and the voltage reference layer.

7 Claims, 5 Drawing Sheets (52) U.S. Cl.
CPC .......... *G06F 3/0445* (2019.05); *G06F 3/0447* (2019.05); *G06F 2203/04105* (2013.01)

(56) References Cited

FOREIGN PATENT DOCUMENTS

| | | | |
|---|---|---|---|
| CN | 106125976 | A | 11/2016 |
| CN | 107168575 | A | 9/2017 |
| JP | 2004234958 | A | 8/2004 |

OTHER PUBLICATIONS

Search Report and Written Opinion for International Application No. PCT/CN2018/075582 dated Apr. 18, 2018.

\* cited by examiner

TOUCH DISPLAY DEVICE

RELATED APPLICATION

The present application is the U.S. national phase entry of PCT/CN2018/075582, with an international filing date of Feb. 7, 2018, which claims the benefit of Chinese Patent Application CN201710329945.1 filed on May 11, 2017, the entire disclosures of which are incorporated herein by reference.

TECHNICAL FIELD

The present disclosure relates to the technical field of display technologies, in particular to a touch display device.

BACKGROUND

With the development of science and technology, common display screens on electronic products are being replaced gradually by three-dimensional (3D) touch screens that are capable of 3D display. The current 3D touch display device is realized on the basis of 2D touch (i.e. touch in the X and Y directions) by adding a pressure touch unit in addition to the display module so as to sense deformation of the display module.

As the size of the display module increases, the mechanical strength thereof also correspondingly increases, so normal finger pressures (0-9.8N) can only cause a slight deformation of the display module. As a result, with respect to a display module with a larger size, the sensitivity of sensing the size of the pressure touch by the deformation of the display module is poor.

SUMMARY

In view of the above, an embodiment of the present disclosure provides a touch display device, which includes a display panel; a backlight that includes a back plate; a pressure touch detection chip; a pressure sensing layer and a voltage reference layer arranged between the display panel and the back plate. The pressure sensing layer and the voltage reference layer are opposite to each other and arranged in different layers. The pressure sensing layer comprises a plurality of sensing electrodes arranged as an array, where each sensing electrode is electrically connected to the pressure touch detection chip through a lead wire. The voltage reference layer is configured to receive a stable reference voltage signal, and the pressure touch detection chip is configured to determine a value of a pressure on the display panel according to a detected change of capacitance between the pressure sensing layer and the voltage reference layer.

Alternatively, the display panel includes an array substrate, and the touch display device further includes a first polarizer disposed on a side of the array substrate facing the back plate, wherein the voltage reference layer is arranged between the first polarizer and the array substrate.

Alternatively, the voltage reference layer can be a transparent conductive layer and covers the entire array substrate.

Alternatively, the voltage reference layer can be grounded.

Alternatively, the backlight can further include a light guide plate and a reflective sheet located between the light guide plate and the back plate; where the pressure sensing layer is arranged on a side of the reflective sheet facing the back plate.

Alternatively, the backlight can further include a resin layer that is located on a side of the reflective sheet facing the back plate and between the reflective sheet and the pressure sensing layer.

Alternatively, the touch display device can further include a flexible circuit board and a printed circuit board, wherein the pressure touch detection chip can be integrated on one of the flexible circuit board and the printed circuit board.

Alternatively, the touch display device can further include a dielectric layer arranged between the pressure sensing layer and the back plate and covering the array substrate.

Alternatively, the dielectric layer can be a non-conductive double-sided adhesive layer.

Alternatively, the double-sided adhesive layer can have a thickness of 0.2 mm-0.3 mm.

Alternatively, the display panel can be a touch display panel.

BRIEF DESCRIPTION OF THE DRAWINGS

The drawings are provided for facilitating further understanding of the present disclosure and they form a part of the description, but they do not intend to limit the present disclosure. In the drawings.

DETAILED DESCRIPTION

In order to make the object, technical solution and advantages clearer, the present disclosure will be described in further detail below with reference to the drawings. Apparently, the embodiments described below are merely some instead of all the embodiments of the present disclosure.

The thicknesses of respective layers as well as the sizes and shapes of the areas shown in the drawings do not represent the real sizes or scales, but they are only used for schematically illustrating the present disclosure.

Figure 1:
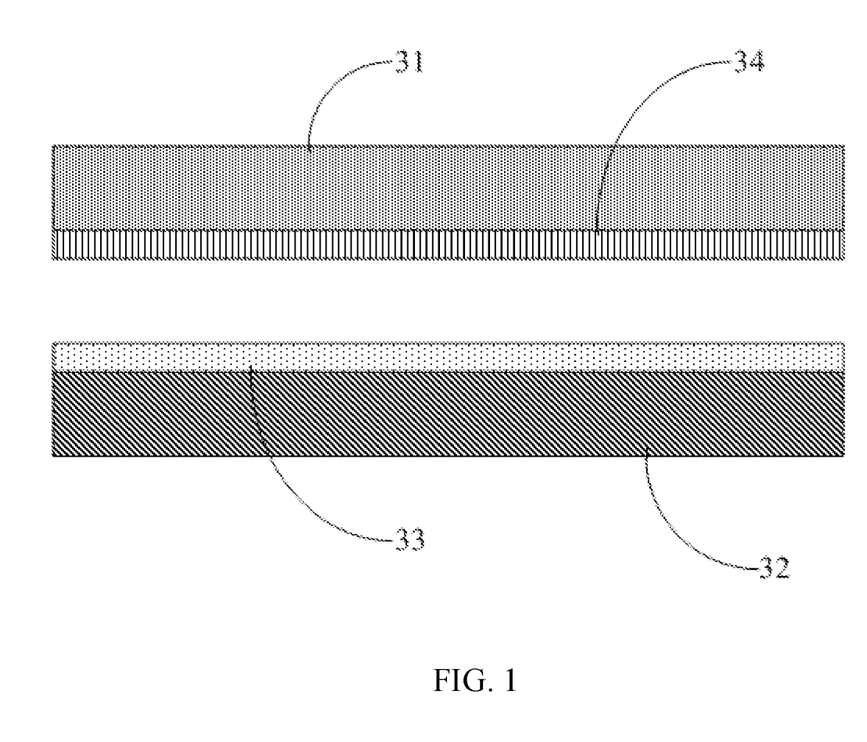
FIG. 1 is a schematic structural diagram of a touch display device provided by an embodiment of the present disclosure.

FIG. 1 is a schematic structural diagram of a touch display device provided by an embodiment of the present disclosure. As shown in FIG. 1, the touch display device includes a display panel 31 and a backlight that includes a back plate 32. The specific arrangement of the display panel 31 and the backlight is the same as that in the related art, so it will not be elaborated herein any more. The touch display device may further include a pressure touch detection chip (not shown in FIG. 1 and can be located in anywhere appropriate), and a pressure sensing layer 33 and a voltage reference layer 34 arranged between the display panel 31 and the back plate 32.

Figure 2:
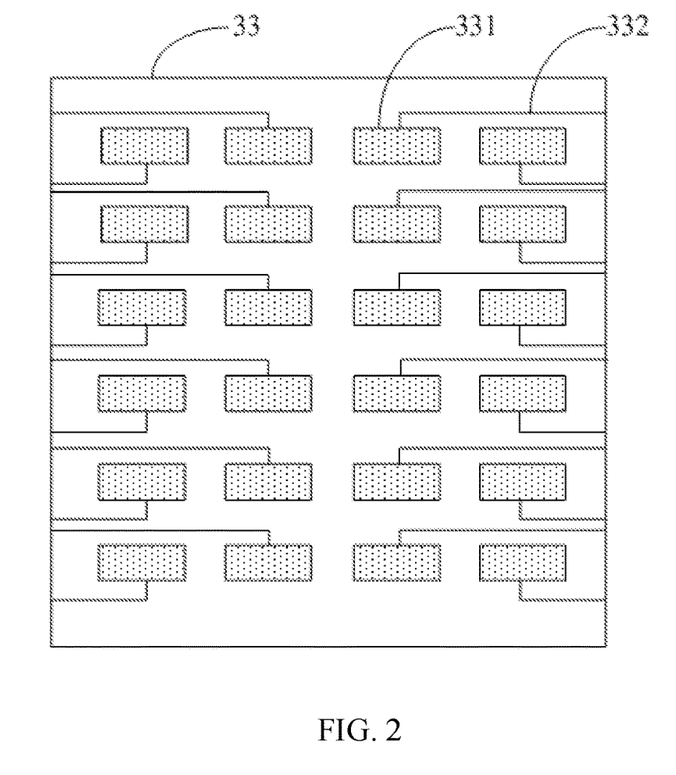
FIG. 2 is a schematic structural diagram of a pressure sensing layer provided by an embodiment of the present disclosure.

FIG. 2 is a schematic structural diagram of a pressure sensing layer 33 provided by an embodiment of the present disclosure. As shown in FIG. 2, the pressure sensing layer 33 includes a plurality of sensing electrodes 331 arranged as an array, and each sensing electrode 331 is electrically connected to the pressure touch detection chip through a lead wire 332.

The voltage reference layer 34 is used for receiving a stable reference voltage signal, and the pressure sensing layer 33 and the voltage reference layer 34 are opposite to each other and arranged in different layers. The pressure touch detection chip is configured to determine a value of a pressure on the display panel 31 according to a detected change of capacitance between the pressure sensing layer 33 and the voltage reference layer 34.

As the pressure sensing layer and the voltage reference layer in the embodiment of the present disclosure are arranged between the display panel and the back plate, and the pressure sensing layer and the voltage reference layer are opposite to each other and arranged in different layers, so a capacitance is formed between the pressure sensing layer and the voltage reference layer. The pressure touch detection chip is configured to determine the value of the pressure on the display panel according to the detected change of capacitance between the pressure sensing layer and the voltage reference layer. In the related art, the pressure touch unit is usually arranged outside of the display module, while in the embodiment of the present disclosure, the pressure sensing layer and the voltage reference layer for forming the capacitance are arranged between the display panel and the back plate (i.e. inside of the display module), thus the size of the pressure can be reflected by detecting the deformation of the display panel. Compared to the related art, the embodiment of the present disclosure can improve sensitivity of pressure touch, which is propitious to realize lighter, thinner and more highly integrated products.

The touch display device in the embodiment of the present disclosure further includes a flexible circuit board and a printed circuit board. The pressure touch detection chip can be integrated on the flexible circuit board or the printed circuit board. Of course, the pressure touch detection chip can also be separately arranged in the touch display device in practice. The specific positions and ways of arrangement of the flexible circuit board and the printed circuit board in the touch display device are similar to those in the related art, which will not be elaborated herein any more.

The display panel provided by the embodiment of the present disclosure is a display panel with a touch function, i.e. a touch display panel. Said display panel with a touch function can detect a specific position of the pressure on the display panel (i.e. detect X and Y coordinates of a pressure point). The display panel with a touch function in the embodiment of the present disclosure can be a self-capacitance touch display panel or a mutual capacitance touch display panel; wherein the specific way of arrangement of the self-capacitance electrodes and the specific way of detecting the touch position for the self-capacitance touch display panel are the same as those in the related art; the specific way of arrangement of the mutual capacitance electrodes (driving electrodes and sensing electrodes that are intersecting and insulated from each other) and the specific way of detecting the touch position for the mutual capacitance touch display panel are the same as those in the related art, so they will not be elaborated herein any more.

Figure 3:
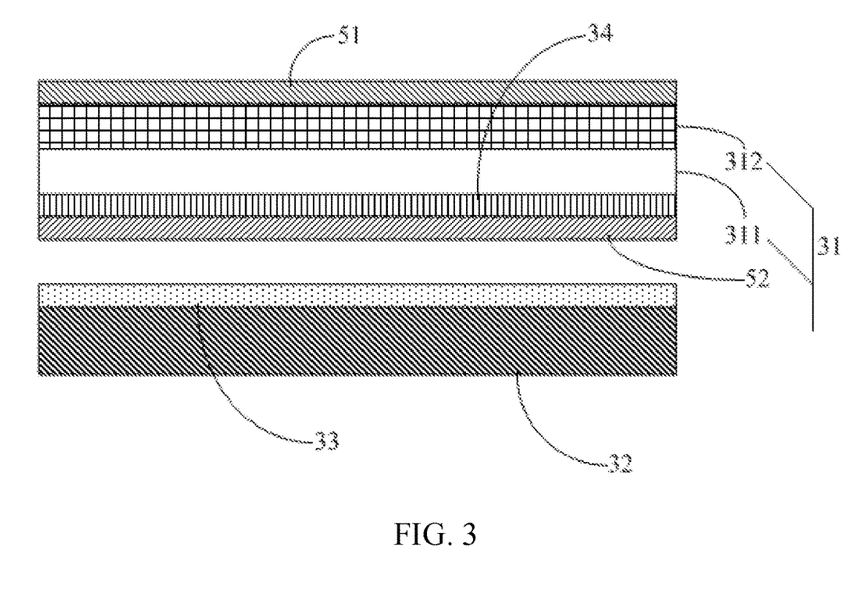
FIG. 3 is a schematic structural diagram of another touch display device provided by an embodiment of the present disclosure.

In a further embodiment, as shown in FIG. 3, the display panel 31 in the touch display device includes an array substrate 311 and a color film substrate 312 arranged opposite to each other. The touch display device further includes a first polarizer 52 on a side of the array substrate 311 facing the back plate 32 and a second polarizer 51 on a side of the color film substrate 312 facing away from the array substrate 311. The specific ways of arrangement of the second polarizer 51 and the first polarizer 52 are the same as those in the related art, so they will not be elaborated herein any more.

Alternatively, the voltage reference layer 34 in this embodiment is arranged between the first polarizer 52 and the array substrate 311. In this way, the voltage reference layer 34 in this embodiment will not be influenced by metal film layers (e.g. gate metal layer, source and drain metal layer) included in the array substrate after receiving a constant voltage signal, enabling the stability of the capacitance formed by the pressure sensing layer 33 and the voltage reference layer 34 to be ensured.

The voltage reference layer 34 in the embodiment of the present disclosure can be a transparent conductive layer that covers the entire array substrate 311. Making the voltage reference layer 34 to be a transparent conductive layer can minimize the impact on the backlight irradiated into the display panel 31 and maximize utilization of light. Making the voltage reference layer 34 to cover the entire array substrate 311 can enable the pressure touch detection chip to detect the pressure on the entire display panel 31 more accurately. In some embodiments, the voltage reference layer 34 can be either a single-layer film formed by indium tin oxide (ITO) or indium zinc oxide (IZO) or a hybrid film layer formed by ITO and IZO.

Alternatively, the voltage reference layer 34 can be grounded, which is more convenient and simple in practice.

The material of the pressure sensing layer 33 in the embodiment of the present disclosure can be a transparent conductive material. For example, it can be either a single-layer film formed by ITO or IZO or a hybrid film layer formed by ITO and IZO. Of course, the material of the pressure sensing layer 33 can also be metal, such as any combination of one or more metals selected from the group consisting of molybdenum (Mo), aluminum (Al), silver (Ag), copper (Cu), etc., which is not specifically limited in this disclosure.

Figure 4:
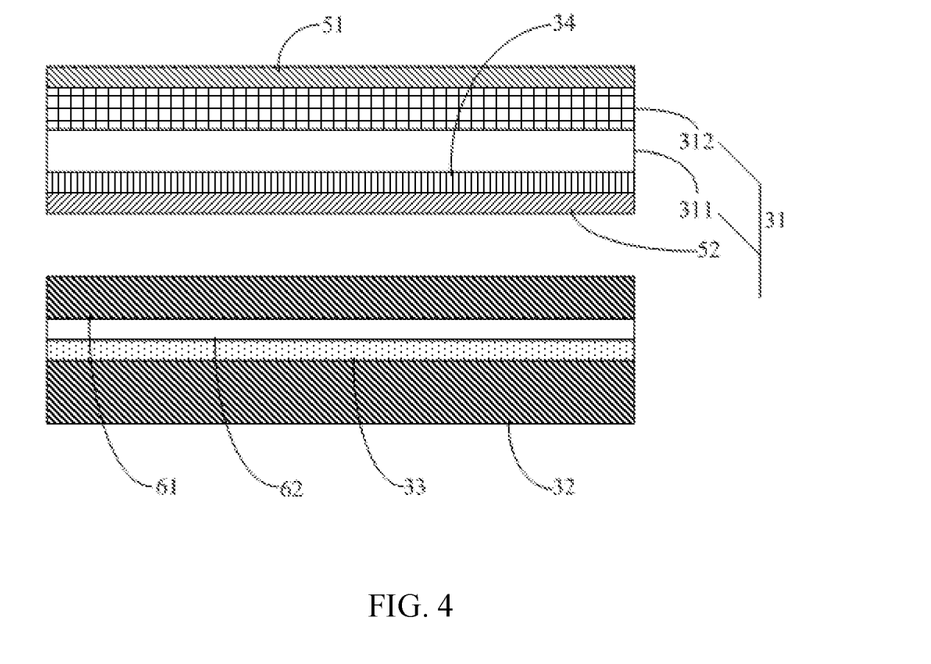
FIG. 4 is a schematic structural diagram of still another touch display device provided by an embodiment of the present disclosure.

In a further embodiment, as shown in FIG. 4, the backlight in the touch display device further includes a light guide plate 61 and a reflective sheet 62 located between the light guide plate 61 and the back plate 32. The specific ways of arrangement of the light guide plate 61 and the reflective sheet 62 in the embodiment of the present disclosure are the same as those in the related art, so they will not be elaborated herein any more.

Alternatively, the pressure sensing layer 33 in this embodiment is arranged on a side of the reflective sheet 62 facing the back plate 32. As shown in FIG. 4, the pressure sensing layer 33 is arranged under the reflective sheet 62 so as to overcome poor optical effects on the display module caused by the pressure sensing layer 33, thereby improving the brightness and the image quality of the touch display device.

Figure 5:
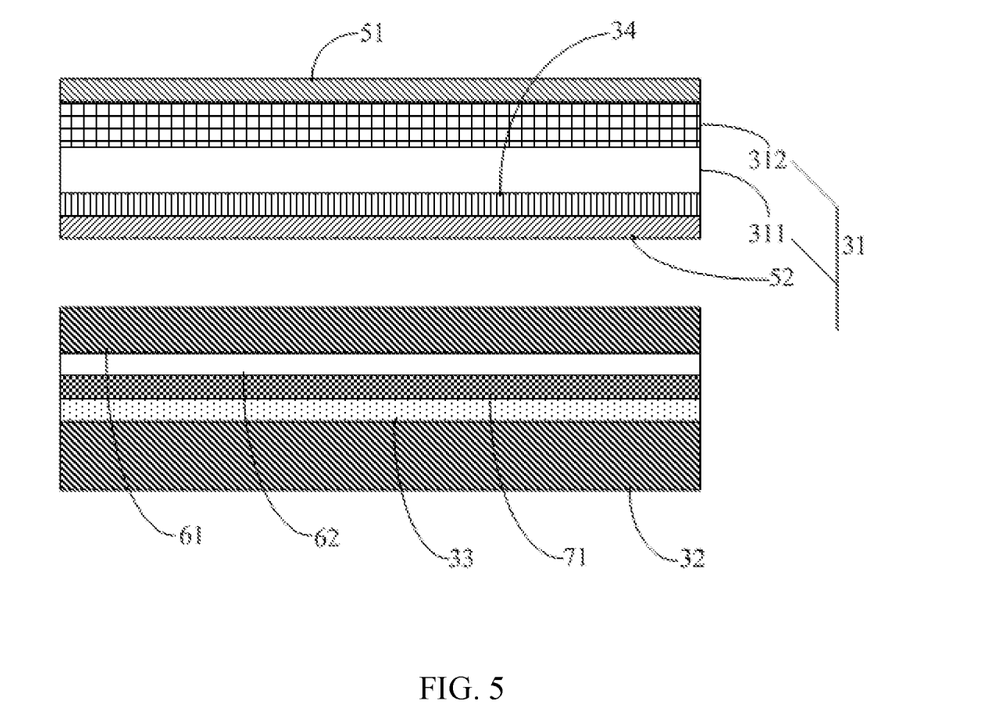
FIG. 5 is a schematic structural diagram of yet another touch display device provided by an embodiment of the present disclosure.

In a further embodiment, as shown in FIG. 5, the backlight of the touch display device further includes a resin layer 71 which is located on a side of the reflective sheet 62 facing the back plate 32 and is located between the reflective sheet 62 and the pressure sensing layer 33. In this case, the resin layer 71 can serve as a carrier for the pressure sensing layer 33. In practice, the pressure sensing layer 33 can be fabricated on the resin layer 71, and then the resin layer 71 is adhered to the reflective sheet 62, which can ensure that the reflective sheet 62 will not be affected (e.g. the reflective sheet 62 will not be scratched) when arranging the pressure sensing layer 33.

Figure 6:
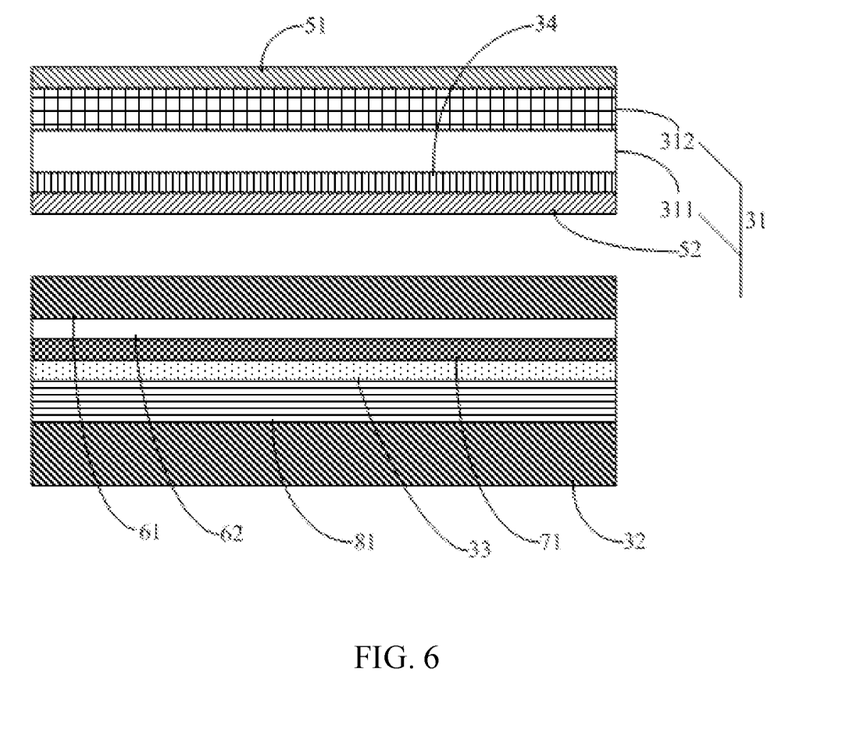
FIG. 6 is a schematic structural diagram of still another touch display device provided by an embodiment of the present disclosure.

In a further embodiment, as shown in FIG. 6, the touch display device further includes a dielectric layer 81 arranged between the pressure sensing layer 33 and the back plate 32, which covers the array substrate 311. The back plate 32 can be made of stainless steel or aluminum, so that the dielectric layer 81 can avoid excessive base capacitance between the pressure sensing layer 33 and the back plate 32. By arranging the dielectric layer 81, the distance between the pressure sensing layer 33 and the back plate 32 increases, and the base capacitance produced between the pressure sensing layer 33 and the back plate 32 decreases. When the display panel is subject to a pressure, the base capacitance imposes a very small impact on the capacitance formed between the pressure sensing layer 33 and the voltage reference layer 34, which can improve sensitivity of pressure touch.

The dielectric layer 81 in this embodiment can be a non-conductive double-sided adhesive layer which can adhere the pressure sensing layer 33 and the back plate 32, so that the pressure sensing layer 33 is steady and immovable. The double-sided adhesive layer may use a non-acid material that has certain stickiness and that is not easily deformable under pressure. For example, the double-sided adhesive layer may be an adhesive layer consisting of an acrylic adhesive with a thickness of 0.05 mm, a resin layer with a thickness of 0.2 mm and an acrylic adhesive with a thickness of 0.05 mm.

Alternatively, the thickness of the double-sided adhesive layer is 0.2 mm to 0.3 mm. It shall be noted that if the double-sided adhesive layer is too thick, the thickness of the touch display device will increase, which is unfavorable for thinning of the touch display device; if the double-sided adhesive layer is too thin, it will have a limited impact on the base capacitance produced between the pressure sensing layer 33 and the back plate 32. Of course, the double-sided adhesive layer may have other thicknesses, which is not limited in the embodiments of the present disclosure.

Figure 7:
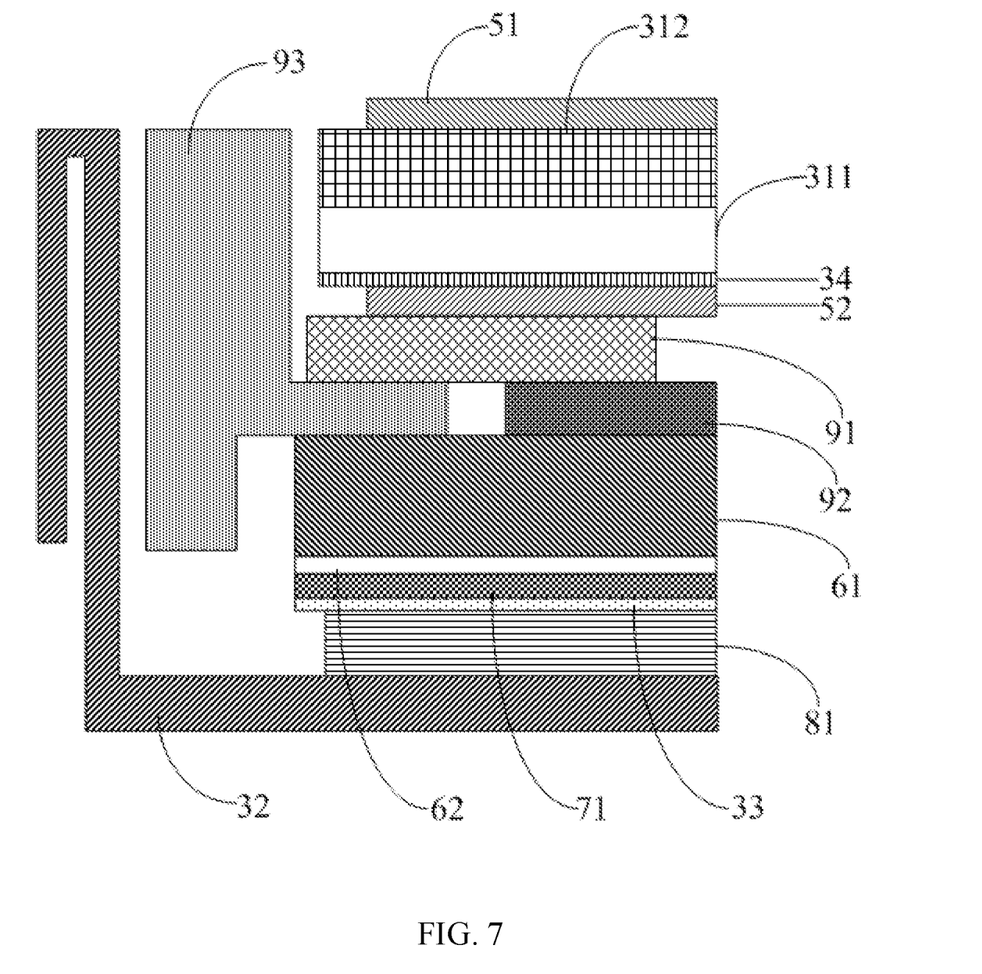
FIG. 7 is a specific structural diagram of a touch display device provided by an embodiment of the present disclosure.

The touch display device provided by the embodiment of the present disclosure will now be described in combination with a specific embodiment. As shown in FIG. 7, the touch display device includes the back plate 32, the dielectric layer 81, the pressure sensing layer 33, the resin layer 71, the reflective sheet 62, the light guide plate 61, a prism 92, a frame glue 93, an opening glue 91, the first polarizer 52, the pressure reference layer 34, the array substrate 311, the color film substrate 312 and the second polarizer 51. The specific ways of arrangement of the back plate 32, the reflective sheet 62, the light guide plate 61, the prism 92 and the frame glue 93 are the same as those in the related art, so they will not be elaborated herein any more.

The specific way of arrangement of the opening glue 91 in the present embodiment is similar to that in the related art, but is different because the thickness of the opening glue 91 in the present embodiment is greater than the thickness of the opening glue in the related art. For example, the thickness of the opening glue 91 can be set to be 0.3 mm. In addition, when selecting the material of the opening glue 91, it is needed to select a material that is not easily deformed under pressure, so that the touch sensitivity of the touch display device will not be influenced.

In this embodiment, each lead wire 332 can be led out through a flexible circuit. Corresponding outlets (not shown in the figure) are arranged on the frame glue 93 and the back plate 32 at positions for leading out by the flexible circuit. Each lead wire 332, after being led out by the flexible circuit, is electrically connected to the pressure touch detection chip, so as to transmit the pressure touch signal to the pressure touch detection chip.

When a user presses the display panel, the display panel with the touch function in the embodiment of the present disclosure can determine a specific position pressed by the finger of the user. The pressure touch detection chip can determine a value of the pressure exerted on the display panel by the user by means of detecting in real time the change of capacitance (which reflects the magnitude of deformation of the display panel) between the pressure sensing layer and the voltage reference layer.

In summary, the present disclosure provides a touch display device, which includes a display panel and a backlight that includes a back plate. The touch display device may further include a pressure touch detection chip, and a pressure sensing layer and a voltage reference layer arranged between the display panel and the back plate. The pressure sensing layer includes a plurality of sensing electrodes arranged as an array, each sensing electrode being electrically connected to the pressure touch detection chip through a lead wire. The voltage reference layer is used for receiving a constant voltage signal and is arranged in a different layer from the pressure sensing layer to face each other. The pressure touch detection chip is configured to determine a value of a pressure on the display panel according to a detected change of capacitance between the pressure sensing layer and the voltage reference layer. Compared to the related art in which the pressure touch unit is arranged outside of the display module, the pressure sensing layer and the voltage reference layer for forming the capacitance in the embodiment of the present disclosure are arranged between the display panel and the back plate, i.e. they are arranged inside of the display module, which can determine the value of the pressure by detecting the deformation of the display panel. Compared to the related art in which the value of the pressure is determined by detecting the deformation of the display module, the technical solution of the present disclosure can improve sensitivity of pressure touch.

Apparently, those skilled in the art can make various modifications and variations to the embodiments of the present disclosure without departing from the spirit and scope of the present disclosure. Therefore, if these modifications and variations fall into the scope of the claims of the present disclosure and their equivalents, then the present disclosure includes these modifications and variations.

The invention claimed is:
1. A touch display device comprising:
 a display panel;
 a backlight including a back plate;
 a pressure touch detection chip;
 a pressure sensing layer and a voltage reference layer arranged between the display panel and the back plate, the pressure sensing layer and the voltage reference layer being opposite to each other and arranged in different layers;
 wherein the pressure sensing layer comprises a plurality of sensing electrodes arranged as an array, each sensing electrode being electrically connected to the pressure touch detection chip through a lead wire;
 the voltage reference layer is configured to receive a stable reference voltage signal;
 the pressure touch detection chip is configured to determine a value of a pressure on the display panel according to a detected change of capacitance between the pressure sensing layer and the voltage reference layer;

wherein the display panel comprises an array substrate, and the touch display device further comprises a first polarizer disposed on a side of the array substrate facing the back plate, wherein the voltage reference layer is arranged between the first polarizer and the array substrate such that the voltage reference layer is in direct contact with the first polarizer and the array substrate;

wherein the backlight further comprises a light guide plate and a reflective sheet located between the light guide plate and the back plate; wherein the pressure sensing layer is arranged on a side of the reflective sheet facing the back plate, and the reflective sheet is in direct contact with the light guide plate;

wherein the touch display device further comprises a dielectric layer arranged between the pressure sensing layer and the back plate and covering the array substrate;

wherein the dielectric layer is a non-conductive double-sided adhesive layer which adheres the pressure sensing layer and the back plate, such that the dielectric layer directly connects the pressure sensing layer and the back plate.

2. The touch display device according to claim 1, wherein the voltage reference layer is a transparent conductive layer and covers the entire array substrate.

3. The touch display device according to claim 2, wherein the voltage reference layer is grounded.

4. The touch display device according to claim 1, wherein the backlight further comprises a resin layer that is located on a side of the reflective sheet facing the back plate and between the reflective sheet and the pressure sensing layer.

5. The touch display device according to claim 1, further comprising a flexible circuit board and a printed circuit board, wherein the pressure touch detection chip is integrated on one of the flexible circuit board and the printed circuit board.

6. The touch display device according to claim 1, wherein the double-sided adhesive layer has a thickness of 0.2 mm-0.3 mm.

7. The touch display device according to claim 1, wherein the display panel is a touch display panel.

\* \* \* \* \*